United States Patent
Tian

(10) Patent No.: US 12,172,891 B2
(45) Date of Patent: Dec. 24, 2024

(54) METHOD FOR PREPARING LITHIUM IRON PHOSPHATE USING BY-PRODUCT FERROUS SULFATE FROM TITANIUM DIOXIDE

(71) Applicant: SHENZHEN WARRANT NEW ENERGY CO., LTD., Shenzhen (CN)

(72) Inventor: Yihong Tian, Shenzhen (CN)

(73) Assignee: SHENZHEN WARRANT NEW ENERGY CO., LTD., Shenzhen (CN)

( * ) Notice: Subject to any disclaimer, the term of this patent is extended or adjusted under 35 U.S.C. 154(b) by 0 days.

(21) Appl. No.: 18/621,122

(22) Filed: Mar. 29, 2024

(65) Prior Publication Data

US 2024/0239660 A1    Jul. 18, 2024

Related U.S. Application Data

(63) Continuation of application No. PCT/CN2022/107776, filed on Jul. 26, 2022.

(30) Foreign Application Priority Data

Mar. 15, 2022 (CN) .......................... 202210251781.6

(51) Int. Cl.
| | | |
|---|---|---|
| *C01B 25/45* | (2006.01) | |
| *H01M 4/36* | (2006.01) | |
| *H01M 4/58* | (2010.01) | |
| *H01M 4/587* | (2010.01) | |

(52) U.S. Cl.
CPC .............. *C01B 25/45* (2013.01); *H01M 4/366* (2013.01); *H01M 4/5825* (2013.01); *H01M 4/587* (2013.01); *C01P 2004/80* (2013.01); *C01P 2006/40* (2013.01)

(58) Field of Classification Search
CPC .................................................... C01B 25/45
See application file for complete search history.

(56) References Cited

U.S. PATENT DOCUMENTS

| | | | |
|---|---|---|---|
| 2012/0058039 A1 | 3/2012 | Huang | |
| 2014/0054494 A1* | 2/2014 | Huang | C01B 25/45 252/182.1 |
| 2015/0086461 A1* | 3/2015 | Wang | C01G 49/009 423/306 |

FOREIGN PATENT DOCUMENTS

| | | |
|---|---|---|
| CN | 101752564 A | 6/2010 |
| CN | 102249208 A | 11/2011 |
| CN | 105060266 A | 11/2015 |
| CN | 108046337 A | 5/2018 |
| CN | 110872107 A | 3/2020 |
| CN | 112125292 A | 12/2020 |
| CN | 113929150 A | 1/2022 |
| CN | 114538404 A | 5/2022 |
| JP | 2013127898 A | 6/2013 |
| JP | 2013161654 A | 8/2013 |
| WO | 2005068358 A1 | 7/2005 |

OTHER PUBLICATIONS

Notification to Grant Patent Right for Invention, Chinese Application No. 202210251781.6, mailed Jun. 12, 2023 (7 pages).
CNIPA, Office Action issued for Chinese Application No. 202210251781.6, mailed Dec. 30, 2022 (25 pages).
"Introduction to Fine Chemical Engineering", Shen, Yiding, p. 260, Claims 1-10, published Aug. 31, 1998 (6 pages).
"Research on the Refinement of Ferrous Sulfate, a By-product of Titanium Dioxide Production" by Hua, Bin et al., Journal of Shanghai University, vol. 5, Issue 1, pp. 59-61, Claims 1-10, published Aug. 31, 1998 (3 pages).

\* cited by examiner

*Primary Examiner* — Austin Murata

(57) ABSTRACT

The present invention relates to the field of lithium battery material preparation technologies, particularly to a method for preparing lithium iron phosphate using the by-product ferrous sulfate from titanium dioxide. The method comprises the following steps: dissolving by-product ferrous sulfate from titanium dioxide in acidic aqueous solution, stirring with iron powder for reaction; adding iron phosphate or lithium iron phosphate waste powder to the solution, heating and stirring the mixture, allowing the mixture to settle and cool, and filtering the cooled mixture to obtain a purified ferrous sulfate solution; and adding phosphoric acid and a lithium hydroxide solution in an autoclave, and finally adding the purified ferrous sulfate solution, heating the mixture under stirring, then filtering, washing, and drying the mixture to obtain lithium iron phosphate powder; Using it as an iron source to prepare positive electrode materials for lithium-ion batteries has excellent electrochemical performance.

7 Claims, No Drawings

METHOD FOR PREPARING LITHIUM IRON PHOSPHATE USING BY-PRODUCT FERROUS SULFATE FROM TITANIUM DIOXIDE

TECHNICAL FIELD

The present invention relates to the field of lithium-ion battery material preparation technologies, particularly to a method for preparing lithium iron phosphate using the by-product ferrous sulfate from titanium dioxide.

BACKGROUND

In recent years, lithium iron phosphate, as a positive electrode material, has been increasingly applied in various fields such as automobiles, energy storage, ships, and communication base stations, owing to its excellent safety performance. Lithium iron phosphate, due to its long cycle life, low cost, environmental friendliness, and high safety performance, is currently the most promising positive electrode material for lithium-ion batteries in the market.

Titanium white, i.e., titanium dioxide, is an important inorganic pigment. The industrial processes for preparing titanium white mainly include the sulfuric acid method and the chlorination method. Among these methods, the sulfuric acid method for preparing titanium white generates ferrous sulfate as a major by-product, containing various metal impurities and hydrolyzed titanium sulfate impurities at different degrees of hydrolysis. Through impurity removal processes, the by-product ferrous sulfate is utilized to prepare lithium iron phosphate, which is used as a positive electrode material for the lithium-ion battery. This approach not only addresses the significant storage issues associated with the ferrous sulfate by-product but also meets the development needs of the battery industry.

The prior art has already disclosed a method for preparing iron phosphate using the by-product ferrous sulfate from titanium dioxide, as indicated in the Chinese Patent with Publication No. CN101531355A. In this patent, ferrous sulfate heptahydrate (also known as green vitriol), the by-product of titanium white, is used as the main material, and sulfides and sodium polysulfide are used as purifying agents to purify green vitriol before using it in the preparation of iron phosphate. This patent utilizes sulfur ions as functional ions for impurity removal, which involves using $S^{2-}$ to react with metal impurities to form insoluble metal sulfides, thereby eliminating impurity metal ions. However, sodium sulfide exhibits inadequate titanium removal effectiveness and generates hydrogen sulfide gas during the process, posing significant safety risks to both humans and the environment. The Chinese Patent with Publication No. CN107857243A discloses a method in which phosphoric acid and a flocculant are added to a ferrous sulfate solution. Through hydrolysis and filtration, a filtrate is yielded, and after adjusting the pH of the filtrate with an alkaline substance, a precipitate is obtained through a precipitation reaction, followed by filtration to obtain a filter cake. The filter cake is subjected to an oxidation reaction in phosphoric acid with the addition of an oxidizing agent. Subsequently, a surfactant is added, the pH of the solution is adjusted, and the reaction is carried out to obtain a white precipitate. The precipitate is then washed, dried, and ground to yield iron phosphate. In this patent, phosphoric acid is utilized, with phosphate anions serving as functional ions for precipitation to remove impurities. Then the pH is adjusted using an alkaline substance, resulting in excess alkaline cations, such as ammonium ions and sodium ions, in the prepared ferrous sulfate solution, and the addition of a flocculant introduces organic compounds into the solution, increasing the difficulty of wastewater treatment.

In addition to the environmental concerns mentioned above, most existing technologies lack targeted reports on the impurity removal effectiveness of titanium, and they fail to achieve extremely low control values for titanium content.

It is evident from the above that there is a pressing technological challenge in the field to provide an environmentally friendly and efficient method for removing impurities from the by-product ferrous sulfate of titanium white, and utilizing it in the preparation of lithium iron phosphate.

SUMMARY

To address the above issues, the present invention provides a method for preparing lithium iron phosphate using the by-product ferrous sulfate from titanium dioxide. The present invention employs the following technical solutions.

A method for preparing lithium iron phosphate using the by-product ferrous sulfate from titanium dioxide comprises the following steps:

(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, and stir the mixture to react at a temperature of 80-90° C. for 2-3 hours until the pH approaches 2.

(2) Add iron phosphate or lithium iron phosphate waste powder to the aforementioned ferrous sulfate solution, stir the mixture at a temperature of 80-90° C. for 30-60 minutes, allow the mixture to settle and cool to below 40° C., and filter the cooled mixture to obtain a purified ferrous sulfate solution.

(3) Dissolve lithium hydroxide in water, add phosphoric acid and the lithium hydroxide solution in a co-current manner in an autoclave for neutralization. Subsequently, add the purified ferrous sulfate solution, heat the mixture under stirring, then filter, wash, and dry the mixture to obtain lithium iron phosphate powder.

In step (1), due to significant variations in impurity content among different by-product ferrous sulfate from titanium dioxide, the solid impurity content in some can exceed 10%, while others may have only around 1% or even lower. Preferably, after stirring and reacting at a temperature of 80-90° C. for 2-3 hours until the pH approaches 2, the mixture is precipitated and settled, thus obtaining the supernatant, namely the ferrous sulfate solution.

Furthermore, in step (1), the amount of iron powder added is 3-5 wt % of the mass of ferrous sulfate. After adding the iron powder, the mixture is heated to induce a reduction reaction, reducing ions with their metal reactivity following Fe as well as $Fe^{3+}$.

By dissolving the by-product ferrous sulfate from titanium dioxide in an acidic aqueous solution, the process avoids the hydrolysis of divalent iron into trivalent iron that may occur during dissolution in a neutral aqueous solution.

Furthermore, in step (2), iron phosphate or lithium iron phosphate waste powder is added to the ferrous sulfate solution. Specifically, the lithium iron phosphate waste powder comprises disqualified lithium iron phosphate, and positive electrode materials scraped from unused, disqualified pole pieces (free of lithium hexafluorophosphate impurities), primarily consisting of a mixture dominated by lithium iron phosphate and derivatives thereof as well as iron phosphate and derivatives thereof. The addition of iron phosphate or lithium iron phosphate waste powder to the ferrous sulfate solution can avoid the introduction of ions other than $Li^+$, $Fe^{2+}$, $Fe^{3+}$, and $PO_4^{3-}$, and the decomposition of these ions in acidic conditions releases $PO_4^{3-}$, thus achieving the purpose of forming phosphate (impurity ion salts). Additionally, the phosphate powder aids in filtration, facilitating the deep purification of green vitriol and ensuring that the content of titanium ions of various valence states, measured in terms of $FeSO_4$ basis, is less than 10 ppm in the ferrous sulfate solution.

Furthermore, in step (2), the amount of iron phosphate or lithium iron phosphate waste added is 2-3 wt % of the mass of ferrous sulfate in the ferrous sulfate solution.

Furthermore, in step (3), the lithium hydroxide solution and the phosphoric acid are co-currently stirred and mixed, with the temperature controlled in a range of 40-45° C.; the purified ferrous sulfate solution is added under stirring, with the temperature raised to 180° C. and maintained for 1-2 hours. Preferably, the addition of the purified ferrous sulfate solution is completed within 30-40 minutes.

Furthermore, in step (3), the reaction product is cooled to reduce temperature, filtered, and washed. The resultant filter cake is dried in air at a temperature of 105-110° C. or mixed with an organic carbon source for spray drying in air, thus obtaining the lithium iron phosphate powder. Specifically, the lithium sulfate filtrate, after the filtration, enters a recovery system for the recovery of $Li^+$.

Furthermore, in step (3), the molar ratio of the substances added is Li:Fe:P=3:(0.99-1):1.

The present invention further provides lithium iron phosphate prepared by using the aforementioned method.

The present invention further provides the application of the aforementioned lithium iron phosphate as a positive electrode material in the lithium-ion battery.

The present invention further provides carbon-coated lithium iron phosphate prepared by using the aforementioned method. The method for preparing carbon-coated lithium iron phosphate comprises the following steps:
 (1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, and stir the mixture to react at a temperature of 80-90° C. for 2-3 hours until the pH approaches 2.
 (2) Add iron phosphate or lithium iron phosphate waste powder to the aforementioned ferrous sulfate solution, stir the mixture at a temperature of 80-90° C. for 30-60 minutes, allow the mixture to settle and cool to below 40° C., and filter the cooled mixture to obtain a purified ferrous sulfate solution.
 (3) Dissolve lithium hydroxide in water, add phosphoric acid and the lithium hydroxide solution in a co-current manner in an autoclave for neutralization. Subsequently, add the purified ferrous sulfate solution, heat the mixture under stirring, filter the mixture to obtain a filter cake, and wash the filter cake with water.
 (4) Mix the filter cake with water and a carbon source for reaction, followed by spray drying; calcine the dried powder at a temperature of 650° C. for 4-6 hours under the protection of a nitrogen atmosphere to obtain the carbon-coated lithium iron phosphate powder.

Specifically, the carbon source is glucose.

The present invention further provides lithium manganese iron phosphate prepared by using the aforementioned method. The method for preparing lithium manganese iron phosphate comprises the following steps:
 (1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, and stir the mixture to react at a temperature of 80-90° C. for 2-3 hours until the pH approaches 2.
 (2) Add iron phosphate or lithium iron phosphate waste powder to the aforementioned ferrous sulfate solution, stir the mixture at a temperature of 80-90° C. for 30-60 minutes, allow the mixture to settle and cool to below 40° C., and filter the cooled mixture to obtain a purified ferrous sulfate solution.
 (3) Dissolve lithium hydroxide in water, add phosphoric acid and the lithium hydroxide solution in a co-current manner in an autoclave for neutralization. Subsequently, add the purified ferrous sulfate solution and a manganese source, heat the mixture under stirring, then filter, wash, and dry the mixture to obtain lithium manganese iron phosphate powder.

Specifically, the manganese source is manganese sulfate. The molar ratio of the added substances is Li:M:P=3:(0.99-1):1, where M represents the combined amount of iron and manganese. Iron and manganese can be mixed in any proportion, with the preferred molar ratio being Fe:Mn=(3:7)-(7:3).

Compared with the prior art, the present invention has the following beneficial effects:

The method for preparing lithium iron phosphate using the by-product ferrous sulfate from titanium dioxide according to the present invention has advantages in the purification process. During the purification of ferrous sulfate solution, the addition of iron phosphate or lithium iron phosphate waste powder can avoid the introduction of ions other than $Li^+$, $Fe^{2+}$, $Fe^{3+}$, and $PO_4^{3-}$, and the decomposition of these ions in acidic conditions releases $PO_4^{3-}$, thus achieving the purpose of forming phosphate (impurity ion salts). Additionally, iron phosphate or lithium iron phosphate powder also acts as an adsorbent and aids in filtration, facilitating the deep purification of green vitriol and ensuring that the content of titanium ions of various valence states, measured in terms of $FeSO_4$ basis, is less than 10 ppm in the ferrous sulfate solution. The purification process of the ferrous sulfate solution in the present invention is simple, cost-effective, safe, and environmentally friendly. Using the ferrous sulfate solution as an iron source in a hydrothermal reaction with lithium hydroxide and phosphoric acid, the obtained lithium iron phosphate powder serves as a positive electrode material for the lithium-ion battery with excellent performance. This not only produces high-performance materials but also effectively utilizes titanium dioxide by-products.

DETAILED DESCRIPTION

The technical solutions in the embodiments of the present invention will be clearly and completely described below with reference to the embodiments in the present invention, and it is obvious that the described embodiments are only a part of the embodiments of the present invention but not all of them. Based on the embodiments of the present invention, all other embodiments obtained by those of ordinary skill in the art without creative effort shall fall within the protection scope of the present invention.

Embodiment 1

A method for preparing lithium iron phosphate using the by-product ferrous sulfate from titanium dioxide comprises the following steps:
(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, accounting for 3 wt % of the mass of ferrous sulfate, and stir the mixture to react at a temperature of 80° C. for 3 hours until the pH approaches 2. Precipitate the mixture and allow the precipitate to settle, thus obtaining the supernatant, namely the ferrous sulfate solution.
(2) Add, to the aforementioned ferrous sulfate solution, iron phosphate, which accounts for 2 wt % of the mass of ferrous sulfate in the ferrous sulfate solution. Stir the mixture at a temperature of 90° C. for 30 minutes, allow the mixture to settle and cool to below 40° C., and filter the cooled mixture to obtain a purified ferrous sulfate solution with a concentration of 1 mol/L.
(3) Dissolve lithium hydroxide in water, add phosphoric acid and the lithium hydroxide solution in a co-current manner in an autoclave for stirring and mixture to achieve neutralization, with the temperature controlled in a range of 40-45° C. Then, add the purified ferrous sulfate solution under stirring, completing the addition within 30 minutes. Raise the temperature to 180° C. and maintain it for 2 hours. Cool the reaction product to reduce the temperature, followed by filtration and washing. Dry the filter cake at a temperature of 105-110° C. in air to obtain lithium iron phosphate powder. The molar ratio of the added substances is Li:Fe:P=3.0:1.0:1.0. After completing the addition, the concentration of the iron element in the reaction system is 0.5 mol/L.

An appropriate amount of the purified ferrous sulfate solution obtained in this embodiment is taken to measure the titanium content in the ferrous sulfate solution, and the resultant titanium content in this embodiment is 8.9 ppm.

Embodiment 2

A method for preparing lithium iron phosphate using the by-product ferrous sulfate from titanium dioxide comprises the following steps:
(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, accounting for 5 wt % of the mass of ferrous sulfate, and stir the mixture to react at a temperature of 90° C. for 2 hours until the pH approaches 2. Precipitate the mixture and allow the precipitate to settle, thus obtaining the supernatant, namely the ferrous sulfate solution.
(2) Add, to the aforementioned ferrous sulfate solution, iron phosphate, which accounts for 3 wt % of the mass of ferrous sulfate in the ferrous sulfate solution. Stir the mixture at a temperature of 80° C. for 60 minutes, allow the mixture to settle and cool to below 40° C., and filter the cooled mixture to obtain a purified ferrous sulfate solution with a concentration of 1 mol/L.
(3) Dissolve lithium hydroxide in water, add phosphoric acid and the lithium hydroxide solution in a co-current manner in an autoclave for stirring and mixture to achieve neutralization, with the temperature controlled in a range of 40-45° C. Then, add the purified ferrous sulfate solution under stirring, completing the addition within 40 minutes. Raise the temperature to 180° C. and maintain it for 1 hour. Cool the reaction product to reduce the temperature, followed by filtration and washing. Dry the filter cake at a temperature of 105-110° C. in air to obtain lithium iron phosphate powder. The molar ratio of the added substances is Li:Fe:P=3.0:1.0:1.0. After completing the addition, the concentration of the iron element in the reaction system is 0.5 mol/L.

An appropriate amount of the purified ferrous sulfate solution obtained in this embodiment is taken to measure the titanium content in the ferrous sulfate solution, and the resultant titanium content in this embodiment is 8.2 ppm.

Embodiment 3

A method for preparing lithium iron phosphate using the by-product ferrous sulfate from titanium dioxide comprises the following steps:
(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, accounting for 3 wt % of the mass of ferrous sulfate, and stir the mixture to react at a temperature of 80° C. for 3 hours until the pH approaches 2. Precipitate the mixture and allow the precipitate to settle, thus obtaining the supernatant, namely the ferrous sulfate solution.
(2) Add, to the aforementioned ferrous sulfate solution, the lithium iron phosphate waste, which accounts for 2 wt % of the mass of ferrous sulfate in the ferrous sulfate solution. Stir the mixture at a temperature of 90° C. for 30 minutes, allow the mixture to settle and cool to below 40° C., and filter the cooled mixture to obtain a purified ferrous sulfate solution with a concentration of 1 mol/L.
(3) Dissolve lithium hydroxide in water, add phosphoric acid and the lithium hydroxide solution in a co-current manner in an autoclave for stirring and mixture to achieve neutralization, with the temperature controlled in a range of 40-45° C. Then, add the purified ferrous sulfate solution under stirring, completing the addition within 30 minutes. Raise the temperature to 180° C. and maintain it for 2 hours. Cool the reaction product to reduce the temperature, followed by filtration and washing. Dry the filter cake at a temperature of 105-110° C. in air to obtain lithium iron phosphate powder. The molar ratio of the added substances is Li:Fe:P=3.0:1.0:1.0. After completing the addition, the concentration of the iron element in the reaction system is 0.5 mol/L.

An appropriate amount of the purified ferrous sulfate solution obtained in this embodiment is taken to measure the titanium content in the ferrous sulfate solution, and the resultant titanium content in this embodiment is 9.6 ppm.

Embodiment 4

A method for preparing carbon-coated lithium iron phosphate using the by-product ferrous sulfate from titanium dioxide comprises the following steps:

(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, accounting for 3 wt % of the mass of ferrous sulfate, and stir the mixture to react at a temperature of 80° C. for 2 hours until the pH approaches 2. Precipitate the mixture and allow the precipitate to settle, thus obtaining the supernatant, namely the ferrous sulfate solution.

(2) Add, to the aforementioned ferrous sulfate solution, iron phosphate, which accounts for 2 wt % of the mass of ferrous sulfate in the ferrous sulfate solution. Stir the mixture at a temperature of 85° C. for 40 minutes, allow the mixture to settle and cool to below 40° C., and filter the cooled mixture to obtain a purified ferrous sulfate solution with a concentration of 1 mol/L.

(3) Dissolve lithium hydroxide in water, add phosphoric acid and the lithium hydroxide solution in a co-current manner in an autoclave for stirring and mixture to achieve neutralization, with the temperature controlled in a range of 40-45° C. Then, add the purified ferrous sulfate solution, completing the addition within 30 minutes. Raise the temperature to 180° C. and maintain it for 2 hours. Cool the reaction product to reduce the temperature, filter the cooled product to obtain a filter cake, and wash the filter cake with water.

(4) Mix the filter cake with water and glucose for reaction, followed by spray drying; calcine the dried powder at a temperature of 650° C. for 4-6 hours under the protection of a nitrogen atmosphere to obtain the carbon-coated lithium iron phosphate powder. The molar ratio of the added substances is Li:Fe:P=3.0:1.0:1.0. After completing the addition, the concentration of the iron element in the reaction system is 0.6 mol/L, and the mass ratio of glucose to lithium iron phosphate is 1.35:10.

An appropriate amount of the purified ferrous sulfate solution obtained in this embodiment is taken to measure the titanium content in the ferrous sulfate solution, and the resultant titanium content in this embodiment is 9.1 ppm.

Embodiment 5

A method for preparing lithium manganese iron phosphate using the by-product ferrous sulfate from titanium dioxide comprises the following steps:

(1) Adjust the pH of water to a range of 1.5-2.0 by adding sulfuric acid, then dissolve the by-product ferrous sulfate from titanium dioxide in water to prepare a solution with a concentration close to saturation. Subsequently, add iron powder, accounting for 3 wt % of the mass of ferrous sulfate, and stir the mixture to react at a temperature of 90° C. for 3 hours until the pH approaches 2. Precipitate the mixture and allow the precipitate to settle, thus obtaining the supernatant, namely the ferrous sulfate solution.

(2) Add, to the aforementioned ferrous sulfate solution, iron phosphate, which accounts for 2 wt % of the mass of ferrous sulfate in the ferrous sulfate solution. Stir the mixture at a temperature of 80° C. for 50 minutes, allow the mixture to settle and cool to below 40° C., and filter the cooled mixture to obtain a purified ferrous sulfate solution with a concentration of 1 mol/L.

(3) Dissolve lithium hydroxide in water, add phosphoric acid and the lithium hydroxide solution in a co-current manner in an autoclave for stirring and mixture to achieve neutralization, with the temperature controlled in a range of 40-45° C. Then, add a mixed solution of the purified ferrous sulfate and manganese sulfate under stirring, completing the addition within 30 minutes. Raise the temperature to 180° C. and maintain it for 2 hours. Cool the reaction product to reduce the temperature, followed by filtration and washing. Dry the filter cake at a temperature of 105-110° C. in air to obtain lithium manganese iron phosphate powder. The molar ratio of the added substances is Li:M:P=3.0:1.0:1.0, where M represents the combined amount of iron and manganese. The molar ratio of iron to manganese is Fe:Mn=1:1. After completing the addition, the concentration of the iron element in the reaction system is 0.4 mol/L.

An appropriate amount of the purified ferrous sulfate solution obtained in this embodiment is taken to measure the titanium content in the ferrous sulfate solution, and the resultant titanium content in this embodiment is 9.9 ppm.

Comparative Example 1

In this comparative example, the ferrous sulfate solution is prepared using commercially available analytical pure ferrous sulfate from the Komar Chemical brand. The preparation method for the remaining lithium iron phosphate is the same as in Embodiment 1, that is:

Dissolve lithium hydroxide in water, add phosphoric acid and the lithium hydroxide solution in a co-current manner in an autoclave for stirring and mixture to achieve neutralization, with the temperature controlled in a range of 40-45° C. Then, add the ferrous sulfate solution under stirring, completing the addition within 30 minutes. Raise the temperature to 180° C. and maintain it for 2 hours. Cool the reaction product to reduce the temperature, followed by filtration and washing. Dry the filter cake at a temperature of 105-110° C. in air to obtain lithium iron phosphate powder. The molar ratio of the added substances is Li:Fe:P=3.0:1.0:1.0.

An appropriate amount of the ferrous sulfate solution obtained in this comparative example is taken to measure the titanium content in the ferrous sulfate solution, and the resultant titanium content in this comparative example is 31.6 ppm.

Lithium iron phosphate, carbon-coated lithium iron carbonate, and lithium manganese iron carbonate prepared in Embodiments 1-5 and Comparative Example 1 were used as positive electrodes for batteries to test their charge and discharge performance. Specifically, lithium iron phosphate or carbon-coated lithium iron carbonate or lithium manganese iron carbonate prepared in each embodiment and comparative example, acetylene black, and a 60% polytetrafluoroethylene emulsion were mixed in a mass ratio of 7:2:1. The mixture was then ground into sheets with a thickness in a range of 0.10-0.15 mm. The sheets were laminated together with aluminum foil, vacuum-dried at a temperature of 120° C. for 12 hours, and used to manufacture the positive electrodes for batteries. Button cells were assembled using metallic lithium foil as the negative electrodes, a 1M $LiPF_6$ solution as the electrolyte, and cell guard 2300 as the separator, in conjunction with the aforementioned positive electrodes. Charge and discharge processes were conducted at room temperature with a 0.1C rate and at −20° C. with a 0.2C rate. The voltage for lithium iron phosphate or carbon-coated lithium iron carbonate batteries during charge and discharge was in a range of 4.2-2.3 V, and the voltage for lithium manganese iron phosphate during charge and discharge was in a range of 4.5-2.3 V. The test results are shown in Table 1.

TABLE 1

| Group | 0.1C Specific Capacity / mAhg$^{-1}$ | 0.2C Specific Capacity/ mAhg$^{-1}$ at −20° C. |
|---|---|---|
| Embodiment 1 | 165.2 | 125.4 |
| Embodiment 2 | 166.3 | 127.1 |
| Embodiment 3 | 164.6 | 124.6 |
| Embodiment 4 | 164.9 | 125.5 |
| Embodiment 5 | 164.3 | 112.1 |
| Comparative Example 1 | 161.6 | 106.2 |

It is evident from the above data that the present invention employs iron phosphate or lithium iron phosphate waste as a precipitant to purify the ferrous sulfate solution, in which the titanium content is reduced significantly, being less than 10 ppm. The purified ferrous sulfate solution, serving as an iron source, undergoes a hydrothermal reaction with lithium hydroxide and phosphoric acid. Due to the low content of impurity ions, such as titanium, in lithium iron phosphate, electrode polarization during charge and discharge is reduced. This allows the prepared lithium iron phosphate material to possess excellent electrochemical performance. Especially in a low-temperature environment, the reduced titanium content enhances the low-temperature performance of the lithium iron phosphate material.

The present invention is further described above with reference to specific embodiments, but it should be understood that the specific description herein should not be construed as limiting the spirit and scope of the present invention, and that various modifications to the above embodiments made by those of ordinary skill in the art upon reading the specification fall within the protection scope of the present invention.

What is claimed is:

1. A method for preparing lithium iron phosphate using by-product ferrous sulfate from titanium dioxide, characterized in comprising the following steps:
   (1) adjusting pH of water to a range of 1.5-2.0 by adding sulfuric acid, then dissolving by-product ferrous sulfate from titanium dioxide in the water to prepare a saturated solution; adding iron powder into the saturated solution, and stirring the iron powder in the saturated solution for reacting at a temperature of 80-90° C. for 2-3 hours until the pH of the saturated solution is 2 to obtain a first mixture, precipitating and settling the first mixture to obtain a supernatant, wherein the supernatant is a ferrous sulfate solution;
   (2) adding iron phosphate or lithium iron phosphate waste powder to the ferrous sulfate solution, stirring the phosphate or the lithium iron phosphate waste powder in the ferrous sulfate solution at a temperature of 80-90° C. for 30-60 minutes to obtain a second mixture, allowing the second mixture to settle and cool to below 40° C., and filtering the second mixture to obtain a purified ferrous sulfate solution;
   (3) dissolving lithium hydroxide in water, adding phosphoric acid and a lithium hydroxide solution in a co-current manner in an autoclave for neutralization; subsequently, adding the purified ferrous sulfate solution to obtain a third mixture, heating the third mixture under stirring, then filtering, washing, and drying the third mixture to obtain lithium iron phosphate powder;
   wherein in step (2), an amount of the iron phosphate or lithium iron phosphate waste added is 2-3 wt % of a mass of ferrous sulfate in the ferrous sulfate solution.

2. The method according to claim 1, wherein in step (1), an amount of the iron powder added is 3-5 wt % of a mass of the ferrous sulfate.

3. The method according to claim 1, wherein in step (3), the lithium hydroxide solution and the phosphoric acid are co-currently stirred and mixed, with a temperature controlled in a range of 40-45° C.; the purified ferrous sulfate solution is added under stirring, with the temperature raised to 180° C. and maintained for 1-2 hours.

4. The method according to claim 1, wherein in step (3), a reaction product is cooled to reduce temperature, filtered, and washed; a resultant filter cake is dried in air at a temperature of 105-110° C. or mixed with an organic carbon source for spray drying in air, thus obtaining the lithium iron phosphate powder.

5. The method according to claim 1, wherein in step (3), a molar ratio of the substances added is Li:Fe:P=3:(0.99-1):1.

6. A method for preparing carbon-coated lithium iron phosphate using by-product ferrous sulfate from titanium dioxide, characterized in comprising the following steps:
   (1) adjusting pH of water to a range of 1.5-2.0 by adding sulfuric acid, then dissolving by-product ferrous sulfate from titanium dioxide in the water to prepare a saturated solution; adding iron powder into the saturated solution, and stirring the iron powder in the saturated solution for reacting at a temperature of 80-90° C. for 2-3 hours until the pH of the saturated solution is 2 to obtain a first mixture, precipitating and settling the first mixture to obtain a supernatant, wherein the supernatant is a ferrous sulfate solution;
   (2) adding iron phosphate or lithium iron phosphate waste powder to the ferrous sulfate solution, stirring the phosphate or the lithium iron phosphate waste powder in the ferrous sulfate solution at a temperature of 80-90° C. for 30-60 minutes to obtain a second mixture, allowing the second mixture to settle and cool to below 40° C., and filtering the second mixture to obtain a purified ferrous sulfate solution;
   (3) dissolving lithium hydroxide in water, adding phosphoric acid and a lithium hydroxide solution in a co-current manner in an autoclave for neutralization; subsequently, adding the purified ferrous sulfate solution to obtain a third mixture, heating the third mixture under stirring, filtering the third mixture to obtain a filter cake, and washing the filter cake with water;
   (4) mixing the filter cake with water and a carbon source for reaction, followed by spray drying; calcining resultant dried powder at a temperature of 650° C. for 4-6 hours under the protection of a nitrogen atmosphere to obtain carbon-coated lithium iron phosphate powder;
   wherein in step (2), an amount of the iron phosphate or lithium iron phosphate waste added is 2-3 wt % of a mass of ferrous sulfate in the ferrous sulfate solution.

7. A method for preparing lithium manganese iron phosphate using by-product ferrous sulfate from titanium dioxide, characterized in comprising the following steps:
   (1) adjusting pH of water to a range of 1.5-2.0 by adding sulfuric acid, then dissolving by-product ferrous sulfate from titanium dioxide in the water to prepare a saturated solution; adding iron powder into the saturated solution, and stirring the iron powder in the saturated solution for reacting at a temperature of 80-90° C. for 2-3 hours until the pH of the saturated solution is 2 to obtain a first mixture, precipitating and settling the first mixture to obtain a supernatant, wherein the supernatant is a ferrous sulfate solution;

(2) adding iron phosphate or lithium iron phosphate waste powder to the ferrous sulfate solution, stirring the iron phosphate or lithium iron phosphate waste powder in the ferrous sulfate solution at a temperature of 80-90° C. for 30-60 minutes to obtain a second mixture, allowing the second mixture to settle and cool to below 40° C., and filtering the second mixture to obtain a purified ferrous sulfate solution;

(3) dissolving lithium hydroxide in water, adding phosphoric acid and a lithium hydroxide solution in a co-current manner in an autoclave for neutralization; subsequently, adding the purified ferrous sulfate solution and a manganese source, heating the third mixture under stirring, then filtering, washing, and drying the third mixture to obtain lithium manganese iron phosphate powder;

wherein in step (2), an amount of the iron phosphate or lithium iron phosphate waste added is 2-3 wt % of a mass of ferrous sulfate in the ferrous sulfate solution.

* * * * *